United States Patent
Watakabe et al.

(10) Patent No.: US 7,628,024 B2
(45) Date of Patent: Dec. 8, 2009

(54) INFORMATION PROCESSING APPARATUS

(75) Inventors: Takeshi Watakabe, Ome (JP); Naoyuki Aizawa, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 831 days.

(21) Appl. No.: 11/079,482

(22) Filed: Mar. 15, 2005

(65) Prior Publication Data

US 2005/0217290 A1  Oct. 6, 2005

(30) Foreign Application Priority Data

Apr. 1, 2004  (JP) .............................. 2004-109173

(51) Int. Cl.
  *F25D 17/04* (2006.01)
  *F25D 23/12* (2006.01)
  *G06F 1/26* (2006.01)
  *H05K 7/20* (2006.01)

(52) U.S. Cl. .................. 62/186; 62/259.2; 713/321; 361/695

(58) Field of Classification Search .................. 62/183, 62/186, 259.2; 318/278, 270, 268; 700/299, 700/300; 713/321, 322; 361/694, 695, 687, 361/688

See application file for complete search history.

(56) References Cited

U.S. PATENT DOCUMENTS

| | | | | | |
|---|---|---|---|---|---|
| 3,308,954 | A | * | 3/1967 | Powder | 210/138 |
| 3,560,824 | A | * | 2/1971 | Burke | 318/806 |
| 5,194,795 | A | * | 3/1993 | Bahn et al. | 318/685 |
| 5,416,397 | A | * | 5/1995 | Mazzara et al. | 318/696 |
| 5,596,257 | A | * | 1/1997 | Miyata et al. | 318/685 |
| 6,070,660 | A | * | 6/2000 | Byrnes et al. | 165/244 |
| 6,601,168 | B1 | * | 7/2003 | Stancil et al. | 713/100 |
| 6,737,824 | B1 | * | 5/2004 | Aslan et al. | 318/471 |
| 2003/0057900 | A1 | * | 3/2003 | Min et al. | 318/114 |
| 2004/0154411 | A1 | * | 8/2004 | Viti | 73/862.325 |
| 2005/0174737 | A1 | * | 8/2005 | Meir | 361/697 |
| 2005/0217646 | A1 | * | 10/2005 | Moller | 123/559.1 |
| 2006/0181232 | A1 | * | 8/2006 | Oljaca et al. | 318/268 |
| 2006/0267529 | A1 | * | 11/2006 | Piefer et al. | 318/432 |

FOREIGN PATENT DOCUMENTS

JP  11-272365 A  10/1999

* cited by examiner

*Primary Examiner*—Chen-Wen Jiang
(74) *Attorney, Agent, or Firm*—Pillsbury Winthrop Shaw Pittman, LLP

(57) ABSTRACT

An information processing apparatus includes a cooling fan, a temperature acquiring unit, and a control unit configured to accelerate the cooling fan in an n-stage and to decelerate it in an m-stage more than the n-stage based on temperature acquired by the temperature acquiring unit.

2 Claims, 6 Drawing Sheets

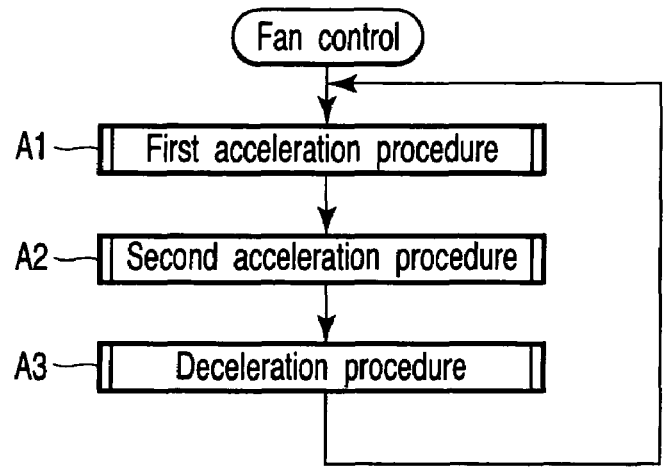
F I G. 4
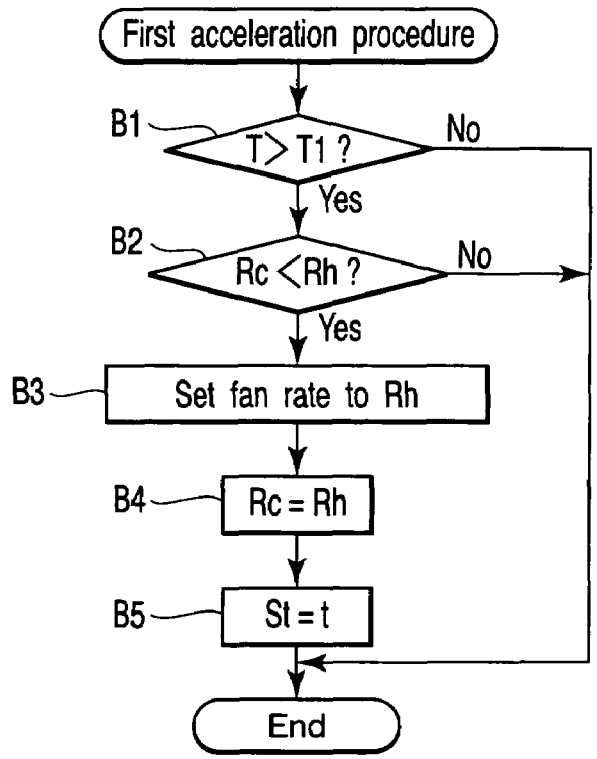
F I G. 5

US 7,628,024 B2

INFORMATION PROCESSING APPARATUS

CROSS-REFERENCE TO RELATED APPLICATIONS

This application is based upon and claims the benefit of priority from prior Japanese Patent Application No. 2004-109173, filed Apr. 1, 2004, the entire contents of which are incorporated herein by reference.

BACKGROUND OF THE INVENTION

1. Field of the Invention

The present invention relates to an information processing apparatus, such as a personal computer having a cooling fan. In particular, the present invention relates to an information processing apparatus, which enables fan control of achieving both cooling performance traceability with rise in temperature, and reduction of non-continuous sound.

2. Description of the Related Art

In many cases, an information processing apparatus such as a personal computer is equipped with a cooling fan for releasing heat of a housing outside and blowing air toward exothermic objects. In general, this kind of information processing apparatus controls a cooling fan rate stepwise.

Conventionally, stepwise rate control of the cooling fan has been carried out in the same manner in both cases where temperature rises and falls. For example, three-stage control means that both acceleration and deceleration of the cooling fan are controlled in three stages. For this reason, the following situation is given depending on load; more specifically, acceleration and deceleration are readily repeated. As a result, a non-continuous sound, such as an annoying noise is frequently made.

In view of such circumstances, the following method has been proposed in order to reduce the non-continuous sound (e.g., see JPN. PAT. APPLN. KOKAI Publication No. 11-272365,). According to the method, if the cooling fan is operated at a low rate with a fall of temperature, deceleration is made only when a predetermined time or more elapses after a rate change is finally made.

However, the cooling performance traceability in a rise of temperature required for the cooling fan must be preferentially taken into consideration. If multi-stage control is carried out, the rate difference caused between stages inevitably takes a large value to some degree. In other words, even if the method disclosed in the foregoing Publication No. 11-272365 is employed, the following problem arises. More specifically, when the cooling fan is decelerated, the rate difference becomes large (sudden change) before and after deceleration. For this reason, the reduction of non-continuous noise is not achieved even if deceleration is made while maintaining regular intervals or more.

BRIEF SUMMARY OF THE INVENTION

According to an embodiment of the present invention, an information processing apparatus comprises a cooling fan; a temperature acquiring unit; a first control unit configured to set a rate of the cooling fan to a first rate when a temperature acquired by the temperature acquiring unit exceeds a first temperature and the rate of the cooling fan is less than the first rate; a second control unit configured to set a rate of the cooling fan to a second rate faster than the first rate when the temperature acquired by the temperature acquiring unit exceeds a second temperature higher than the first temperature and the rate of the cooling fan is less than the second; and a third control unit configured to set the rate of the cooling fan so that the cooling fan is decelerated in a rate difference smaller than a rate difference between the first and second rates when the temperature acquired by the temperature acquiring unit is less than a third temperature lower than the first temperature and an elapsed time after the rate of the cooling fan is set to a current rate exceeds a predetermined time.

According to an another embodiment of the present invention, an information processing apparatus comprises a cooling fan; a temperature acquiring unit; and a control unit configured to accelerate the cooling fan in an n-stage and to decelerate it in an m-stage more than the n-stage based on temperature acquired by the temperature acquiring unit.

And according to an another embodiment of the present invention, a fan control method for an information processing apparatus having a cooling fan, comprises acquiring temperature; and controlling to accelerate the cooling fan in an n-stage and decelerate it in an m-stage more than the n-stage based on the acquired temperature.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a flowchart to explain fan control carried out by the information processing apparatus according to the embodiment;

FIG. 5 is a flowchart to explain a first acceleration procedure taken by the information processing apparatus according to the embodiment;

DETAILED DESCRIPTION OF THE INVENTION

An embodiments of the present will be described below with reference to the accompanying drawings.

Figure 1:
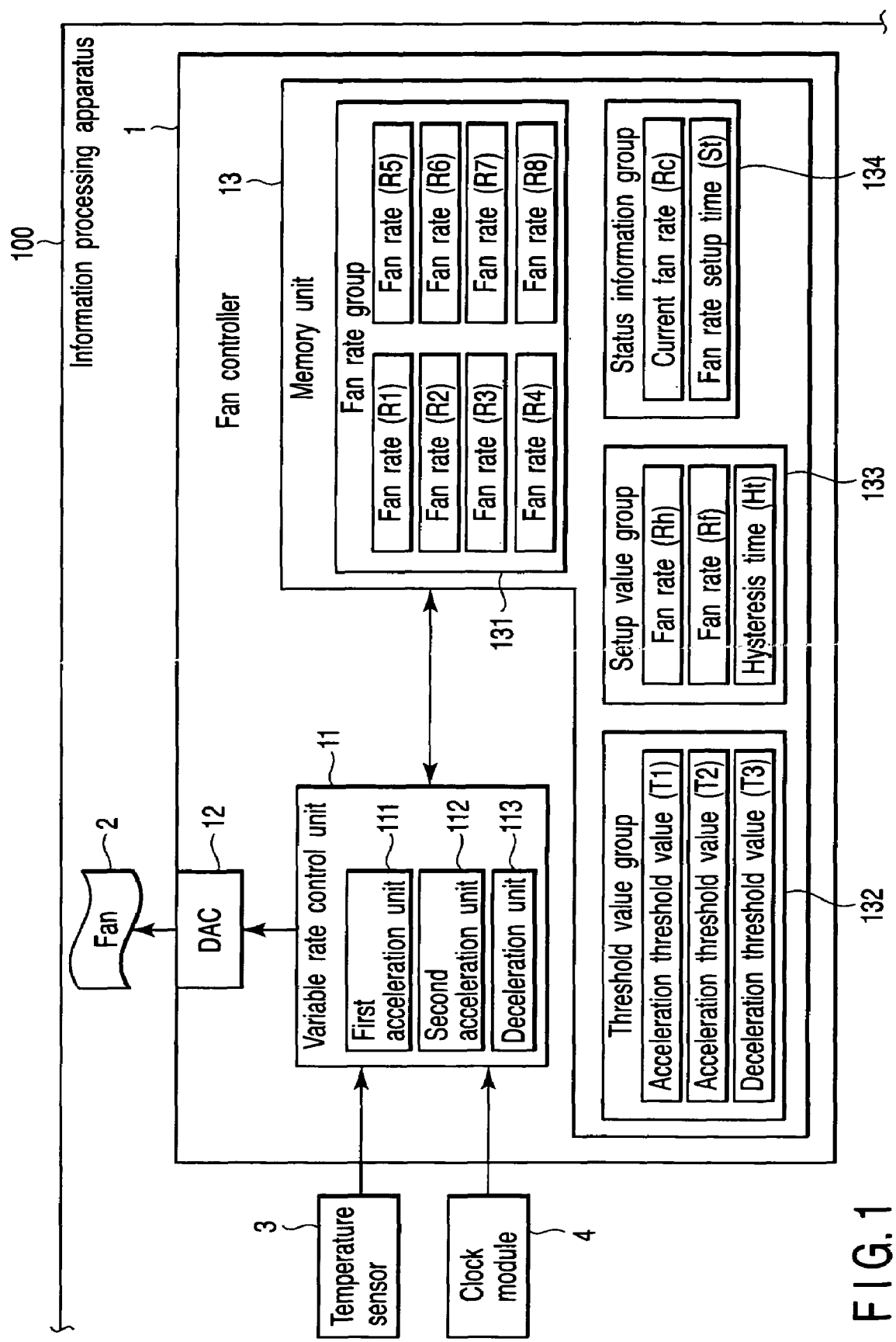
FIG. 1 is a block diagram showing the configuration of a fan controller included in an information processing apparatus according to an embodiment of the present invention.

FIG. 1 is a block diagram showing the configuration of a fan controller included in an information processing apparatus 100 according to an embodiment of the present invention. The information processing apparatus 100 is a desktop type personal computer, for example. As shown in FIG. 1, the apparatus 100 includes fan controller 1, cooling fan 2, temperature sensor 3 and clock module 4 in order to prevent the temperature of a housing from rising more than a predetermined reference.

The fan controller 1 controls the rate of the cooling fan 2 based on temperature data acquired from the temperature sensor 3 and time data acquired from the clock module 4. The fan controller 1 includes variable rate control unit 11, digital-to-analog converter (DAC) 12 and memory unit 13. Here, an example of acquiring temperature data from the temperature sensor 3 is given. In this case, the method of acquiring the temperature data is not limited to above, and any other methods are applicable. Likewise, an example of acquiring time data from the clock module 4 is given. Further, the method of acquiring the time data is not limited to above, and any other methods are applicable. In other words, the matters described above do not relate to the subject matter of the present invention described in this embodiment. In the following, temperature shown by the temperature data from the temperature sensor 3 is referred as T, and time shown by the time data from the clock module 4 is referred as t.

The variable rate control unit 11 has first acceleration unit 111, second acceleration unit 112 and deceleration unit 113. These units each control the cooling fan 2, with the result that they are unified as a system to control the cooling fan 2. The operation principle for controlling the cooling fan 2 will be described later.

The DAC 12 is a circuit for controlling a rate of the cooling fan 2 using voltage. The DAC 12 sets a rate of the cooling fan 2 based on instructions from the variable rate control unit 11. Incidentally, any other methods and configurations may be used without being limited to above so long as the rate of the cooling fan 2 is set.

The memory unit 13 is a rewritable storage medium such as flash memory. The memory unit 13 stores various information of fan rate group 131, threshold value group 132, setup value group 133 and status information group 134. The fan rate group 131 is an aggregate of a fan rate in each stage for controlling the rate of the cooling fan 2 stepwise. In this case, the rate of the cooling fan 2 is controlled using eight (8) stages, and thus, eight (8) fan rates (R1 to R8) are defined. In FIG. 1, R1 is the lowest rate while R8 is the highest rate, thus the rate becomes gradually higher from R1 toward R8.

The threshold value group 132 is an aggregate of threshold values used for a comparison with temperature T in the foregoing first, second acceleration units 111, 112 and deceleration unit 113. In FIG. 1, an acceleration threshold value T1 is used for the first acceleration unit 111. An acceleration threshold value T2 is used for the second acceleration unit 112. A deceleration threshold value T3 is used for the deceleration unit 113. In this case, a relation of T3<T1<T2 is given.

The setup value group 133 is an aggregate of index values when the foregoing first, second acceleration units 111, 112 and deceleration unit 113 control the cooling fan 2. In FIG. 1, a fan rate Rh is a target fan rate when the first acceleration unit 111 accelerates the cooling fan 2. A fan rate Rf is a target fan rate when the second acceleration unit 112 accelerates the cooling fan 2. Hysteresis time Ht is an interval when the deceleration unit 113 decelerates the cooling fan 2 stepwise while maintaining a predetermined interval. The foregoing fan rates Rh and Rf are each stored with an identifier showing any of fan rates R1 to R8 of the fan rate group 131. In this case, the fan rate Rh is stored with an identifier showing the fan rate R5; on the other hand, the fan rate Rf is stored with an identifier showing the fan rate R8.

The status information group 134 is an information aggregate for grasping control conditions of the cooling fan 2 by the first, second acceleration units 111, 112 and deceleration unit 113. In FIG. 1, a current fan rate Rc holds a current rate (any of R1 to R8) of the cooling fan 2. A fan rate setup time St holds time when the cooling fan 2 is set to the current rate.

The operation principle of the fan controller 1 having the configuration described above will be described below with reference to FIG. 2. In the graph shown in FIG. 2, fan rate is shown on the vertical axis, and temperature on the horizontal axis.

Figure 2:
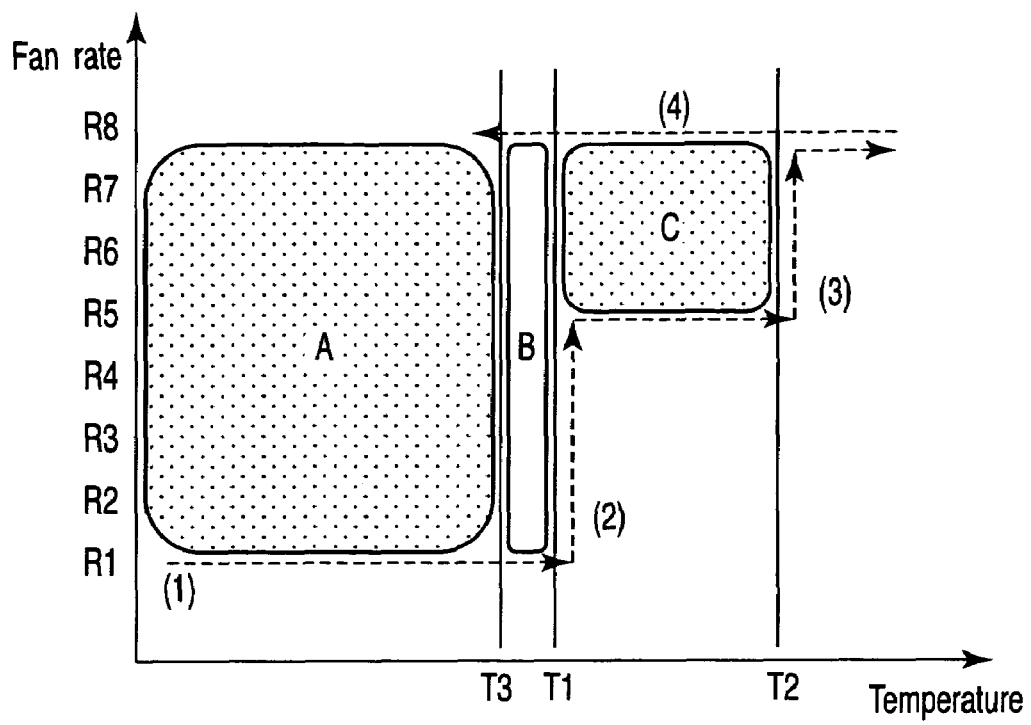
FIG. 2 is a first graph to explain the operation principle of the fan controller included in the information processing apparatus according to the embodiment.
Figure 3:
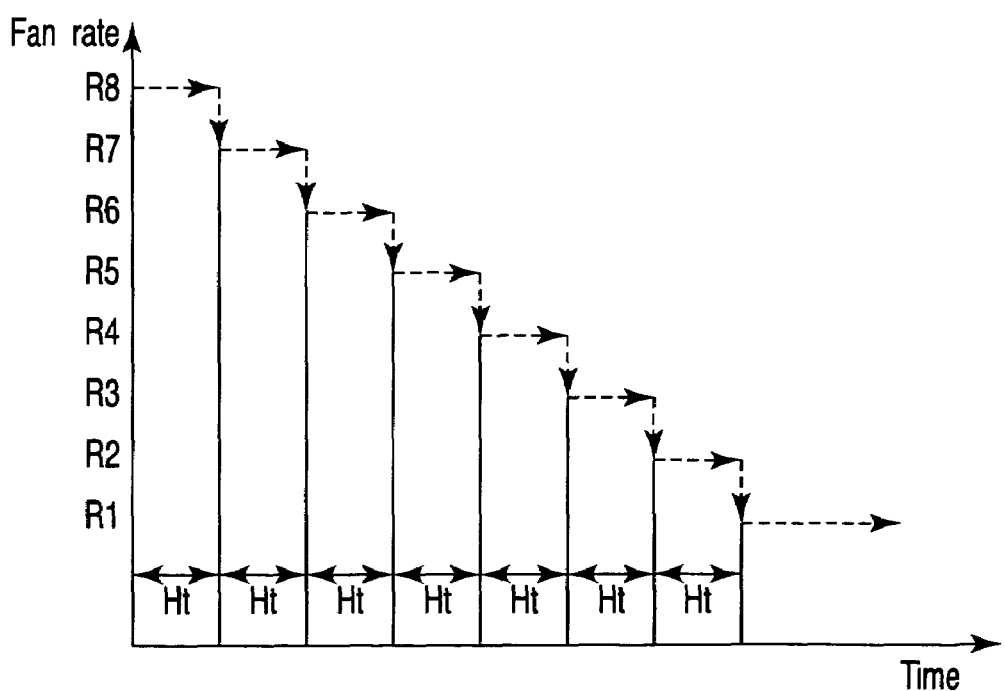
FIG. 3 is a second graph to explain the operation principle of the fan controller included in the information processing apparatus according to the embodiment.

The temperature T shown by temperature data from the temperature sensor 3 rises ((1) of FIG. 2), and thereafter, exceeds the acceleration threshold value T1 ((2) of FIG. 2). In this case, the first acceleration unit 111 determines whether or not the current fan rate Rc is lower than the fan rate Rh. If the current fan rate Rc is lower than the fan rate Rh, the first acceleration unit 111 takes the following procedures. More specifically, the unit 111 immediately accelerates the rate of the cooling fan to the fan rate Rh via the DAC 12. Further, the unit 111 records the fan rate Rh as a current fan rate Rc while recording time t shown by time data acquired from the clock module 4 as a fan rate setup time St.

Regardless of acceleration of the cooling fan 2, the temperature T continues to rise, and then, exceeds the acceleration threshold value T2 ((2) of FIG. 2). In this case, the second acceleration unit 112 determines whether or not the current fan rate Rc is lower than the fan rate Rf. If the current fan rate Rc is lower than the fan rate Rf, the second acceleration unit 112 follows the following procedure. More specifically, the unit 112 immediately accelerates the rate of the cooling fan to the fan rate Rf via the DAC 12. Further, the unit 112 records the fan rate Rf as a current fan rate Rc while recording time t as a fan rate setup time St. In other words, the first and second acceleration units 111 and 112 carry out three-stage acceleration control of R1→R5→R8 with respect to the cooling fan 2.

Thereafter, when the temperature T starts to drop ((4) of FIG. 2), it becomes less than the acceleration threshold values T2 and T1. In this case, the rate of the cooling fan 2 continues to be maintained to the fan rate Rf (i.e., fan rate R8). The temperature rises exceeding the acceleration threshold value T1, and thereafter, falls without exceeding the acceleration threshold value T2. In this case, the rate of the cooling fan 2 continues to be maintained at the fan rate Rh (i.e., fan rate R5). Then, when the temperature becomes less than the deceleration threshold value T3, the deceleration unit 113 determines whether or not a time difference from time elapsed from the fan rate setup time St, that is, time t exceeds hysteresis time Ht. If the time difference exceeds the hysteresis time Ht, the deceleration unit 113 acquires a fan rate value of one stage lower than the current fan rate Rc from the fan rate group 131. Then, the deceleration unit 113 decelerates the rate of the cooling fan 2 to the above-mentioned fan rate via the DAC 12. Simultaneously, the deceleration unit 113 records the fan rate as a current fan rate Rc while recording time t as a fan rate setup time St. The procedure described above is taken, and thereby, deceleration of R8→R7 is made.

Since the elapsed time from the fan rate setup time St soon exceeds the hysteresis time Ht, the deceleration unit 113 makes deceleration of R7→R6 according to the same procedure as above. In other words, the deceleration unit 113 carries out eight-stage deceleration control of R8→R7→R6→R5→R4→R3→R2→R1 with respect to the cooling fan 2 while keeping the hysteresis time Ht.

The variable rate control unit 11 has first, second acceleration units 111, 112 and deceleration unit 113, which each control the cooling fan 2 in the manner described above. The variable rate control unit 11 is used, and thereby, the fan controller 1 controls the cooling fan 2 while realizing both cooling performance traceability in a rise of temperature and reduction of non-continuous sound.

In a zone A of FIG. 2, eight-stage deceleration is made; therefore, any one of fan rates R1 to R8 is capable of being set as the rate of the cooling fan 2. Likewise, in a zone B of FIG. 2, any one of fan rates R1 to R8 is capable of being set as the rate of the cooling fan 2. This is because deceleration to a certain fan rate is made in the zone A, and thereafter, the temperature T again exceeds the deceleration threshold value T3. On the other hand, in a zone C of FIG. 2, the rate of the cooling fan 2 is set within a range from fan rate R5 to R8. The fan rates R5 and R8 has no need of explanation. The fan rates R6 and R7 correspond to the case where deceleration to the fan rates R6 and R7 is made in the zone A, and thereafter, the temperature T again exceeds the acceleration threshold value T1.

FIG. 4 to FIG. 7 is a flowchart to explain the operation procedure relevant to fan control by the information processing apparatus 100 of this embodiment.

FIG. 4 is a flowchart to explain the entire flow of fan control carried out by the information processing apparatus 100. The following procedures are successively and repeatedly taken while the information processing apparatus 100 is operating. One is a first acceleration procedure (step A1) by the first acceleration unit 111 of the variable rate control unit 11. Another is a second acceleration procedure (step A2) by the second acceleration unit 112, and further, another is a deceleration procedure (step A3) performed by the deceleration unit 113.

FIG. 5 is a flowchart to explain the flow of the first acceleration procedure by the first acceleration unit 111 of the variable rate control unit 11.

The first acceleration unit 111 determines whether or not temperature T exceeds the acceleration threshold value T1 (step B1). If the temperature T exceeds the acceleration threshold value T1 (YES in step B1), the unit 111 determines whether or not the current fan rate Rc is lower than the fan rate Rh (step B2). If the current fan rate Rc is lower than the fan rate Rh (YES in step B2), the unit 111 immediately sets the rate of the cooling fan 2 to the fan rate Rh (step B3). Thereafter, the unit 111 updates the current fan rate Rc as fan rate Rh while updating the fan rate setup time St as time t (step B4, B5).

The unit 111 makes an operation of setting the rate of the cooling fan 2 to the fan rate Rh only when the current fan rate Rc is lower than the fan rate Rh according to the determination of step B2. Therefore, the first acceleration procedure does not conflict with control of the cooling fan 2 performed by the second acceleration unit 112.

Figure 6:
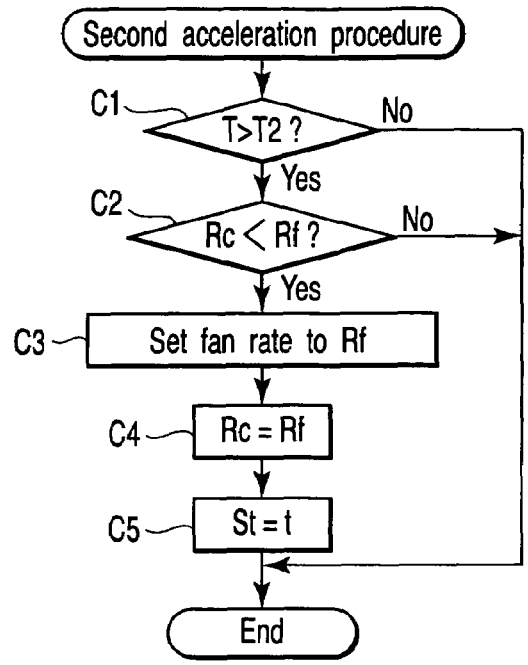
FIG. 6 is a flowchart to explain a second acceleration procedure taken by the information processing apparatus according to the embodiment.

FIG. 6 is a flowchart to explain the flow of the second acceleration procedure by the first acceleration unit 112 of the variable rate control unit 11.

The second acceleration unit 112 determines whether or not temperature T exceeds the acceleration threshold value T2 (step C1). If the temperature T exceeds the acceleration threshold value T2 (YES in step C1), the unit 112 determines whether or not the current fan rate Rc is lower than the fan rate Rf (step C2). If the current fan rate Rc is lower than the fan rate Rf (YES in step C2), the unit 112 immediately sets the rate of the cooling fan 2 to the fan rate Rf (step C3). Thereafter, the unit 112 updates the current fan rate Rc as fan rate Rf while updating the fan rate setup time St as time t (step C4, C5).

As described above, the first and second acceleration units 111 and 112 immediately carry out acceleration control. Therefore, cooling performance traceability during a rise of temperature is secured.

Figure 7:
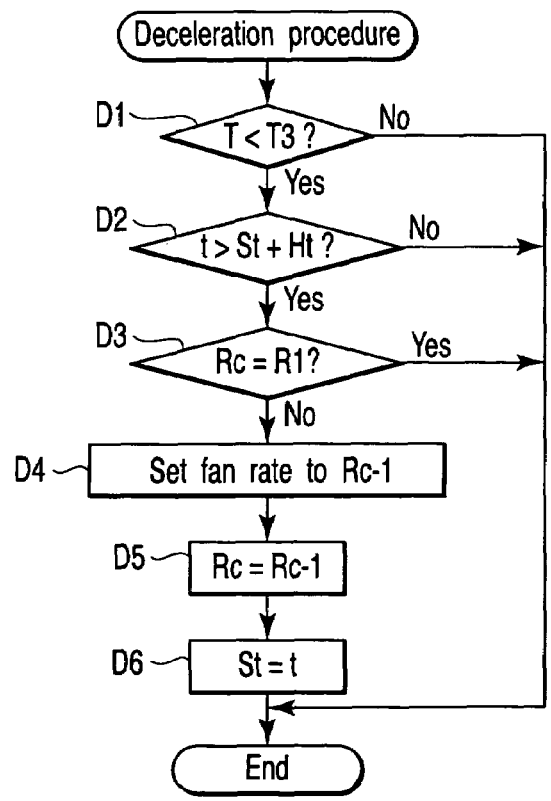
FIG. 7 is a flowchart to explain a deceleration procedure taken by the information processing apparatus according to the embodiment.

FIG. 7 is a flowchart to explain the flow of the deceleration procedure performed by the deceleration unit 113 of the variable rate control unit 11.

The deceleration unit 113 determines whether or not temperature T is less than the deceleration threshold value T3 (step D1). If the temperature T is less than the deceleration threshold value T3 (YES in step D1), the unit 113 determines whether or not time exceeding hysteresis time Ht elapses from the fan rate setup time St (step D2). If the time exceeds the hysteresis time Ht (YES in step D2), the unit 113 determines whether or not the current fan rate Rc is the lowest fan rate, that is, the fan rate R1 (step D3). Determination in step D2 is given, and thereby, reduction of non-continuous sound is realized.

If the current fan rate Rc is not the fan rate R1 (NO in step D3), the deceleration unit 113 decelerates the rate of the cooling fan 2 by one stage (step D4). The unit 113 updates the current fan rate Rc as a fan rate (Rc−1) after one-stage deceleration while updating the fan rate setup time St as time t (step D5, D6).

As described above, the deceleration unit 113 makes deceleration while keeping the interval of hysteresis time Ht. By doing so, it is possible to secure cooling performance traceability during a rise in temperature and reduction of non-continuous sound.

In this embodiment, two cases are given as described above. According to one case, temperature T exceeds the acceleration threshold value T1, and the cooling fan 2 is accelerated to the fan rate Rh. Thereafter, by the preceding acceleration, the temperature T becomes less than the deceleration threshold value T3. According to another case, the temperature T further exceeds the acceleration threshold value T2, and the cooling fan 2 is accelerated to the fan rate Rf. Thereafter, by the preceding acceleration, the temperature T becomes less than the deceleration threshold value T3. In the former case, deceleration of the cooling fan 2 is started if the elapsed time after the first acceleration unit 111 records the fan rate setup time St exceeds hysteresis time Ht. In the latter case, deceleration of the cooling fan 2 is started if the elapsed time after the second acceleration unit 112 records the fan rate setup time St exceeds hysteresis time Ht. The following is a description of the case given below. That is, the deceleration of the cooling fan 2 is started at timing when the elapsed time after temperature T becomes less than the deceleration threshold value T3 exceeds hysteresis time Ht.

Figure 8:
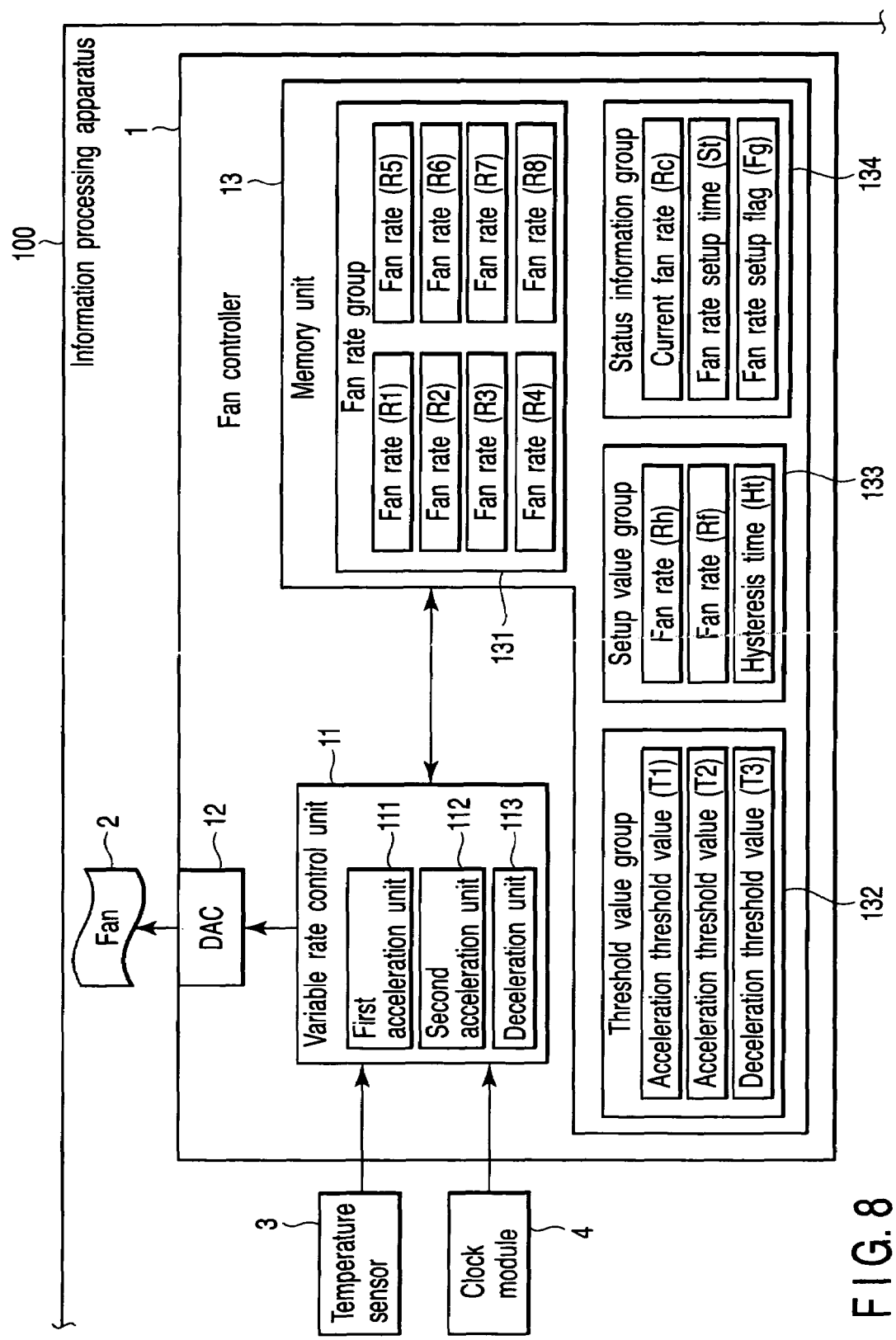
FIG. 8 is a block diagram showing the configuration of another fan controller (modification example) included in the information processing apparatus according to the embodiment.
Figure 9:
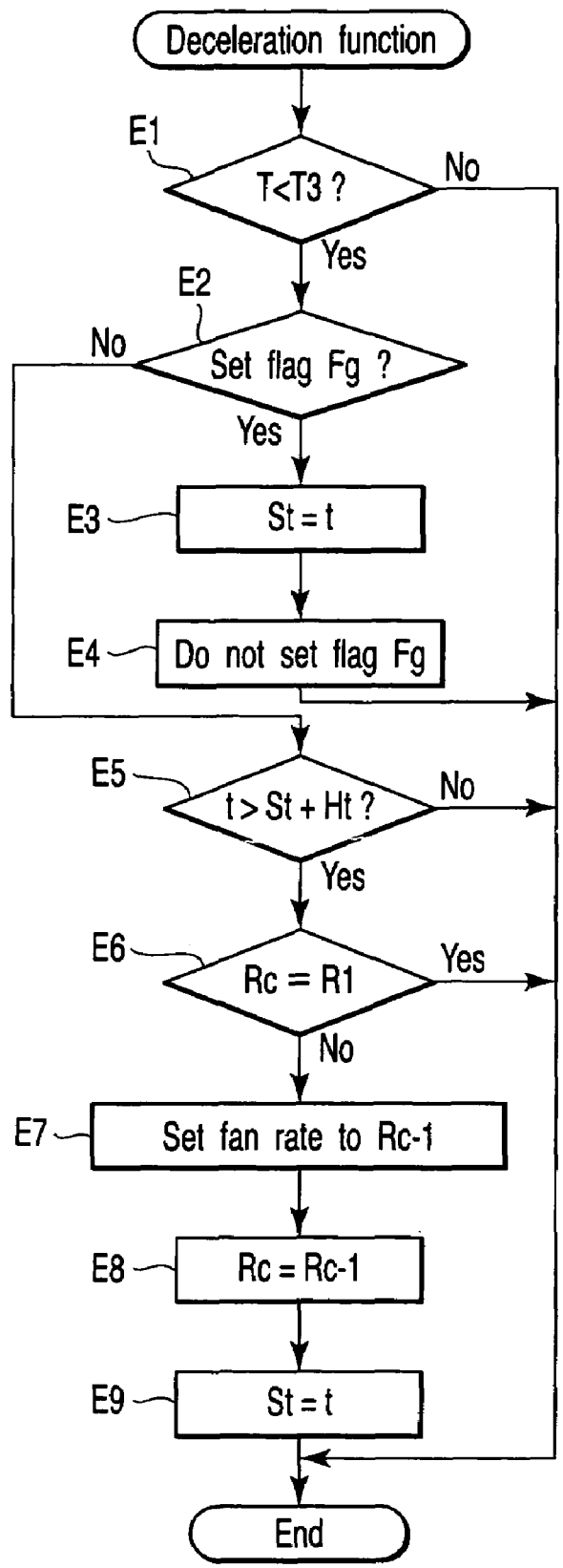
FIG. 9 is a flowchart to explain another deceleration procedure (modification example) taken by the information processing apparatus according to the embodiment.

Thus, the memory unit 13 of the fan controller 1 holds a fan rate setup flag Fg as one of the status information group 134 as seen from FIG. 8. More specifically, the first and second acceleration units 111 and 112 set the current fan rate Rc to the fan rate Rh or Rf. In this case, these units 111 and 112 set the fan rate setup flag Fg in addition to setting of the time t to the fan rate setup time St in step C5 of FIG. 6 or step D6 of FIG. 7. On the other hand, the deceleration unit 113 is operated according to the flow shown in FIG. 9 using the fan rate setup flag Fg.

The deceleration unit 113 determines whether or not temperature T becomes less than the deceleration threshold value T3 (step E1). If the temperature T is less than the deceleration threshold value T3 (YES in step E1), the unit 113 determines whether or not the fan rate setup flag Fg is set (step E2). If the fan rate setup flag Fg is set (YES in step E2), the deceleration unit 113 updates the fan rate setup time St to time t (step E3), and then, does not set the fan rate setup flag Fg (step E4). In other words, the fan rate setup flag Fg is used, and thereby, it is possible to recognize the timing when the temperature T becomes less than deceleration threshold value T3.

On the other hand, if the fan rate setup flag Fg is not set (NO in step E2), the unit 113 determines whether or not the elapsed time from the fan rate setup time St exceeds the hysteresis time Ht (step E5). If the time exceeds the hysteresis time Ht, (YES in step E5), the unit 113 determines whether or not the current fan rate Rc is the lowest rate, that is, the fan rate R1 (step E6).

If the current fan rate Rc is not the fan rate R1 (NO in step E6), the deceleration unit 113 decelerates the rate of the cooling fan 2 by one state (step E7). Then, the deceleration unit 113 updates the current fan rate Rc to a fan rate (Rc−1) after one-stage deceleration while updating the fan rate setup time St to time t (step E8, E9).

The fan rate setup flag Fg is newly provided in order to obtain the deceleration start timing of the cooling fan 2 when the elapsed time after temperature T becomes less than the deceleration threshold value T3 exceeds the hysteresis time Ht. In this case, any other configuration and principle may be employed so long as the foregoing purpose is achieved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:
a cooling fan;
a temperature acquiring unit;
a first control unit configured to immediately accelerate a rate of the cooling fan to a first rate when a temperature acquired by the temperature acquiring unit exceeds a first temperature and the rate of the cooling fan is less than the first rate;
a second control unit configured to immediately accelerate the rate of the cooling fan to a second rate faster than the first rate when the temperature acquired by the temperature acquiring unit exceeds a second temperature higher than the first temperature and the rate of the cooling fan is less than the second rate; and
a third control unit configured to decelerate the rate of the cooling fan every time a predetermined time passes after the rate of the cooling fan is changed when the temperature acquired by the temperature acquiring unit is less than a third temperature lower than the first temperature, so that a decelerating rate is smaller than a rate difference between the first and second rates.

2. A fan control method for an information processing apparatus including a cooling fan, comprising:
acquiring temperature; and
controlling to immediately accelerate the cooling fan in an n-stage and decelerate it in an m-stage more than the n-stage based on the acquired temperature, while maintaining a predetermined interval,
wherein the controlling includes:
first controlling to immediately accelerate a rate of the cooling fan to a first rate when the acquired temperature exceeds a first temperature and the rate of the cooling fan is less than the first rate;
second controlling to immediately accelerate the rate of the cooling fan to a second rate faster than the first rate when the acquired temperature exceeds a second temperature higher than the first temperature and the rate of the cooling fan is less than the second rate; and
third controlling to decelerate the rate of the cooling fan every time a predetermined time passes after the rate of the cooling fan is changed when the acquired temperature is less than a third temperature lower than the first temperature, so that a decelerating rate is smaller than a rate difference between the first and second rates.

\* \* \* \* \*